Figure 1:
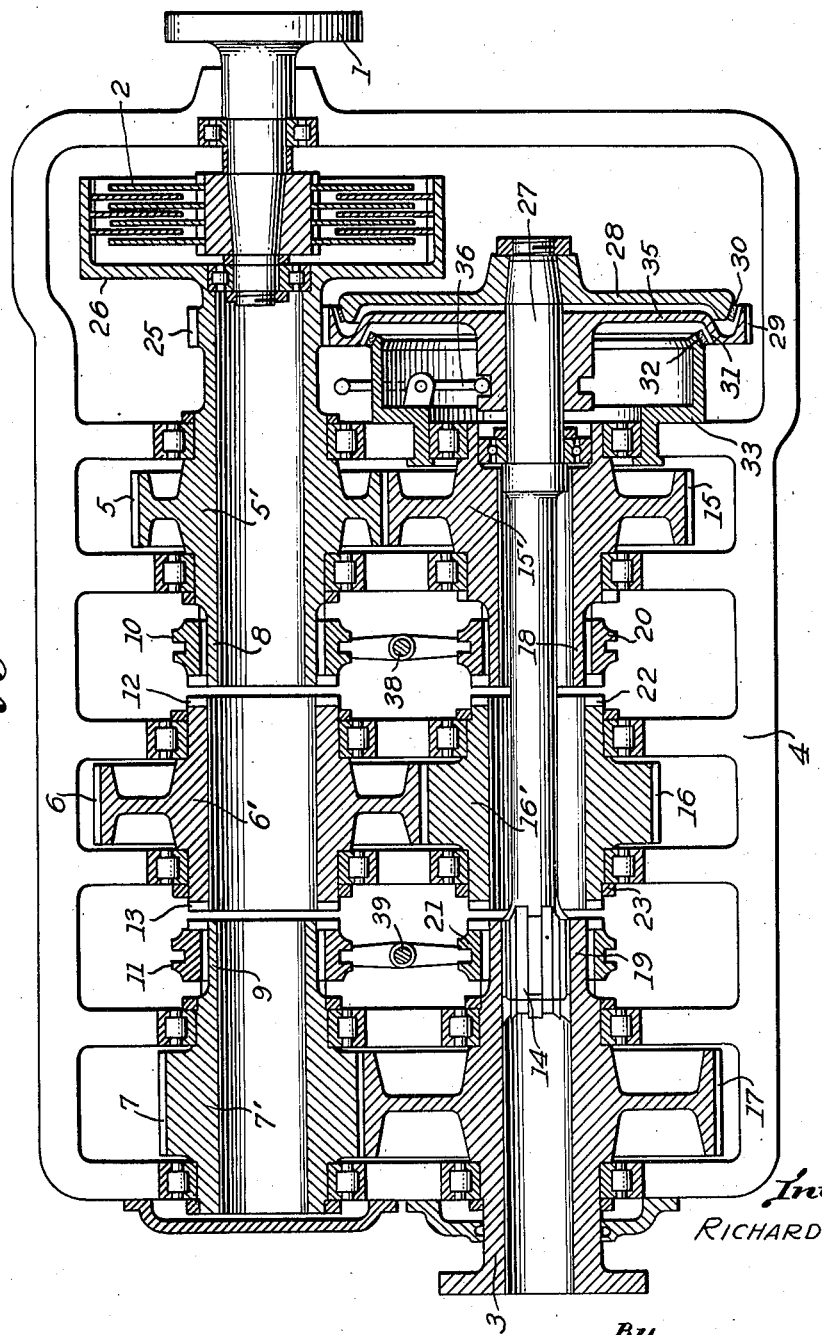

May 13, 1941.  R. LANG  2,241,861

SYNCHRONIZING MECHANISM FOR TRANSMISSIONS

Filed Aug. 30, 1938   2 Sheets-Sheet 1

Inventor:
RICHARD LANG
By Edmund H. Parry Jr.
Attorney

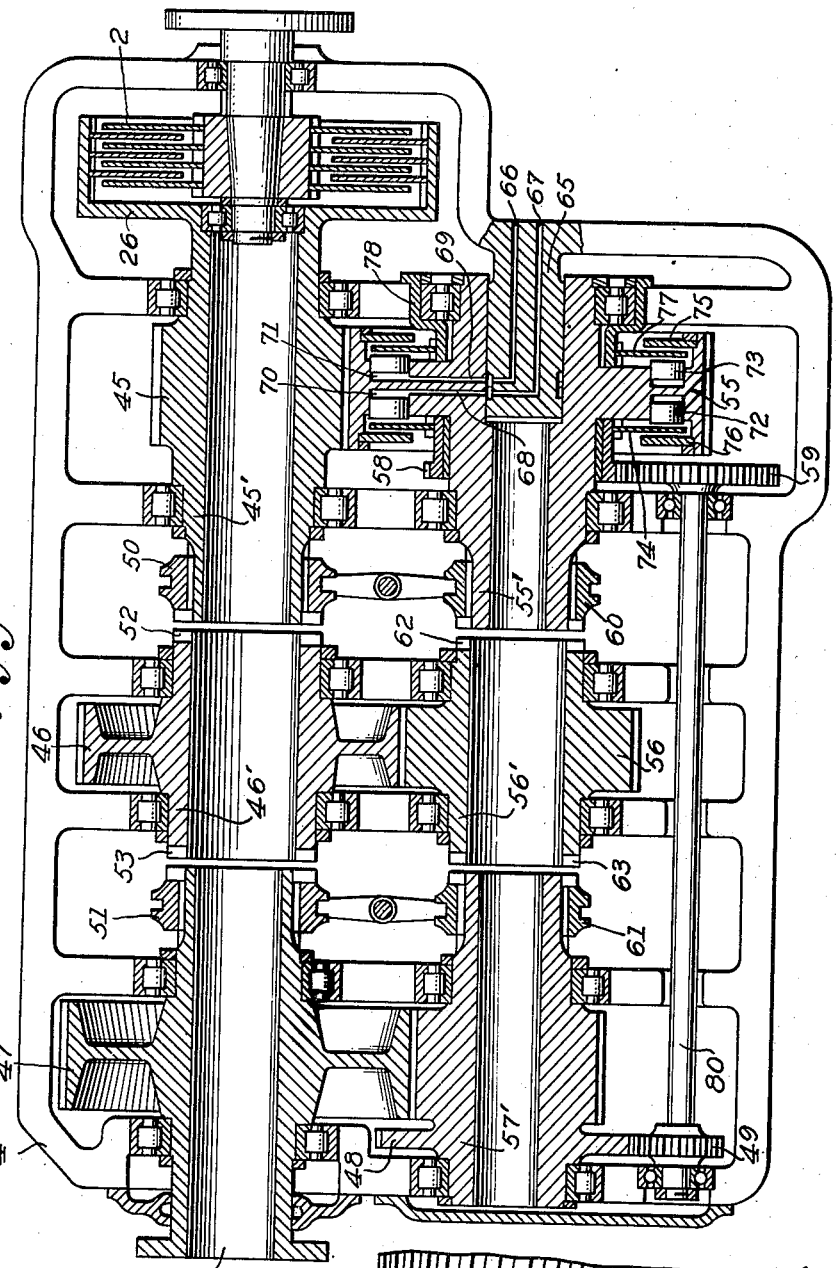
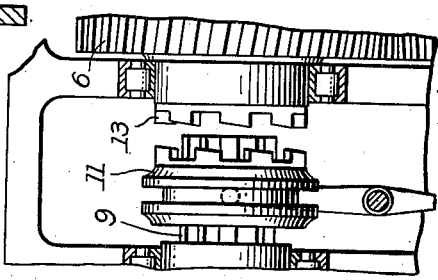

Patented May 13, 1941

2,241,861

UNITED STATES PATENT OFFICE 2,241,861

SYNCHRONIZING MECHANISM FOR TRANSMISSIONS

Richard Lang, Ravensburg, Germany, assignor to Maybach - Motorenbau G. m. b. H., Friedrichshafen, Germany Application August 30, 1938, Serial No. 227,552
In Germany September 15, 1937

11 Claims. (Cl. 74—339)

This invention relates to gear shifting mechanism for multiple speed transmissions, and is directed to an improved device involving a new operating principle for hastening the completion of the shift between different gear selections through rapid synchronization of the parts to be engaged.

It has heretofore been proposed to use various types of synchronizing devices in connection with variable speed transmissions. Usually, according to the present day practice, the transmission comprises a plurality of sets of constantly meshing gears with interposed claw clutches for varying the drive between different combinations of the gear sets and producing different speed ratios between the driving and driven shafts at the opposite ends of the transmission. In bringing about certain gear selections, as when shifting from a lower to a higher gear ratio, the clutch half connected directly or indirectly to the driving shaft is the more rapidly moving and may be slowed down by a synchronizing device in the form of a brake. Again, in obtaining certain gear selections, as when shifting from a higher to a lower speed ratio a claw clutch half rotatable through the driving shaft side of the transmission may be the slower moving part and requires accelerating to bring it to synchronization with its coacting part which is rotated through the driven shaft side of the transmission. For the latter purpose it has heretofore been proposed to provide accelerating devices which operate during the shifting operation through momentary increase in the revolutionary speed of the vehicle motor. Such type of accelerating device is practically undesirable by reason of the fact that it requires speeding up of the vehicle motor, and also by reason of the fact that, whatever the speed to which the motor is brought the amount of acceleration of the clutch part acted upon is necessarily limited by the speed differential, if any, existing between the driving shaft and the clutch part to be speeded up. For the latter reason it is difficult, if not impossible, in many cases to accelerate a clutch part to the desired extent, at least unless the motor be increased to a speed substantially above its normal idling speed.

The present invention is primarily concerned with the provision of means for accelerating those clutch halves on the driving shaft side of the transmission which require accelerating in order to hasten synchronization and engagement with complementary parts rotating at a slower speed through the driven shaft side of the transmission. Provision is also made, however, for slowing down clutch halves in other parts of the transmission which require deceleration in order to be synchronized and engaged with complementary clutch halves which are rotated through the driven shaft side of the transmission at a slower speed. Both acceleration and deceleration of clutch parts are obtained entirely independently of the vehicle motor speed.

For the purpose of accelerating slower moving parts of the transmission which have to be speeded up to bring them in engagement with faster moving parts I employ means driven through the driven shaft of the transmission whereby the clutch part to be speeded up may be driven at a higher speed than would otherwise be possible and which enables synchronization to be obtained extremely rapidly. The proposed device makes use of one or more sets of gears other than the gears of the transmission proper which enables slower moving clutch parts to be speeded up as much as desired, according to their ratio, regardless of the ratio of the gear sets in the transmission. More particularly, an auxiliary transmission is provided between a part of the driven side of the transmission and a part of the driving side of the transmission to be speeded up providing a greater ratio between the driving and driven shaft than the lowest gear of the transmission, the arrangement being such that the auxiliary transmission can be brought into operation momentarily during the course of shifting from one gear selection to another and immediately thereafter rendered inoperative after the parts have been synchronized and the gear shift completed for normal running of the vehicle.

In speaking of the lowest gear ratio of the transmission I have reference to the set or sets of gears of the transmission which produce the lowest relative speed of the driven shaft for any given speed of the driving shaft when the drive is through the driving side. Such same gear ratio if the drive be back through the transmission would be the highest gear ration of the transmission since it would produce the greatest speed of the drive shaft side relative to the driven shaft side. Thus I compare the ratio of the auxiliary transmission with the ratio of the lowest gearing of the transmission when such gearing is being driven back from the driven side of the transmission and would constitute the highest gear ratio as between the driven and driving sides. In the reverse sense my auxiliary transmission would have a lower gear ratio than the lowest gearing of the transmission in the sense of a drive from the driving side to the driven side.

The drive back from the driven shaft of the transmission is effective only for accelerating clutch parts, but the auxiliary transmission is so arranged that braking means can be associated therewith for decelerating parts of the transmission which during shifting require slowing down.

It has heretofore been proposed to employ an auxiliary transmission driven by the driven shaft as a braking device to decelerate a part on the driving shaft side of the transmission, and in such case the gear ratio of the auxiliary transmission has been higher as between the driven and driving shaft sides than the highest gearing of the transmission proper, which latter when driven back from the driving shaft would produce the lowest relative speed of the driving shaft side relative to the driven shaft. The distinctions between such device and the present invention are fundamental, for according to the invention the drive from the driven shaft is employed for accelerating slower moving clutch parts instead of decelerating faster moving clutch parts, and an entirely different auxiliary gear ratio is employed.

As a further feature of the invention it is proposed to provide a common synchronizing means for a multiple speed transmission which is selectively operative on the one hand to accelerate the various parts of the transmission which require speeding up to bring them into synchronization with complementary parts to be engaged in effecting different gear selections, and which operates on the other hand to slow down those other parts of the transmission which require braking in order to effect synchronization with slower moving parts of the transmission in effecting different gear selections. The arrangement is such that in the course of the same shifting operation one part which requires speeding up may be accelerated from the driven shaft, and another which requires slowing down may be decelerated independently of the driven shaft.

While having general application to multiple speed transmissions in any type of vehicle the arrangement has particular utility in those vehicles, such as rail cars, wherein the motor is remotely controlled through electric, pneumatic or hydraulic means, and wherein the necessity of speeding up the motor to produce synchronization of parts during a gear shifting operation is particularly objectionable.

It will be understood that the invention is applicable regardless of whether the actual shifting of parts for different gear selections is effected manually, or through vacuum type or other power operating means.

The invention may be understood by reference to the several embodiments thereof illustrated in the drawings.

Fig. 1 shows one embodiment of the invention applied to a four speed transmission wherein the driving shaft is aligned with the counter shaft gear train, provision being made for accelerating and decelerating different parts of the transmission;

Fig. 2 is a similar view in longitudinal section of another form of transmission wherein the driven shaft is aligned with the main shaft train, and showing a second illustrative embodiment of the invention for accelerating and decelerating different parts of the transmission to be synchronized; and, Fig. 3 is a fragmentary enlarged view illustrating in detail one of the clutch parts to be synchronized.

In the transmission shown in Fig. 1 the driving shaft 1 from the vehicle motor is connected to the transmission through a friction clutch 2 whose casing 26 is fixed to the initial transmission driving shaft 5' carrying gear 5. Aligned in the main shaft train with shaft 5' are shafts 6' and 7' to which are fixed gears 6 and 7. Splined to the left end 8 of shaft 5' for axial movement is a claw clutch sleeve 10 movable into engagement with a coacting clutch half 12 to connect shafts 5' and 6'. A similar claw clutch mechanism, shown in detail in Fig. 3 is provided between shafts 6' and 7', the same comprising a clutch sleeve 11 splined to the right end 9 of shaft 7' coactive with clutch half 13 on the left end of shaft 6'.

The counter shaft train of the transmission includes shafts 15' and 16' carrying gears 15 and 16 which respectively mesh with gears 5 and 6 and driven shaft 3 carrying gear 17 which meshes with gear 7. Splined to the left end 18 of shaft 15' is a clutch sleeve 20 coactive with clutch half 22 on the right end of shaft 16'. On the right end 19 of driven shaft 3 is splined clutch sleeve 21 having teeth coactive with clutch half 23 on the left end of shaft 16'. Lever mechanism pivoted at 38 interconnects clutch sleeves 10 and 20 so that they are reversely movable. When clutch parts 10 and 12 are engaged to interconnect shafts 5' and 6' clutch parts 20 and 22 are disengaged, and vice versa. Similar lever mechanism pivoted at 39 interconnects clutch sleeves 11 and 21 so that they operate alternately to effect driving connection between shafts 6' and 7' in the main train, and shafts 16' and 3 in the counter train.

Through the selective operation of the four clutch mechanisms by gear shifting mechanism (not shown) it is possible to obtain four forward gear speeds as follows:

*1st gear:* Shaft 5', gear 5, gear 15, clutch 20, 22, gear 16, gear 6, clutch 13, 11, gear 7, gear 17, driven shaft 3;

*2nd gear:* Shaft 5', clutch 10, 12, shaft 6', clutch 13, 11, gear 7, gear 17, driven shaft 3;

*3rd gear:* Shaft 5', gear 5, gear 15, clutch 20, 22, shaft 16', clutch 23, 21, driven shaft 3; and,

*4th gear:* Shaft 5', clutch 10, 12, gear 6, gear 16, clutch 23, 21, driven shaft.

As before stated the synchronizing mechanism provides means for accelerating slower moving of the clutch parts to be bought into engagement, and means is also provided for decelerating the faster moving clutch parts. In all cases the right clutch halves of the various clutches, those rotated by connection with the driving shaft through shaft 5', will be the ones acted upon by the synchronizing means. In the case of clutch 10, 12, the right hand clutch half 10 preliminary to engagement will rotate at a faster speed and should be decelerated to effect synchronization and engagement with the slower moving left clutch half 12. Right hand clutch half 13, when driven either through shafts 5' and 6', or through gears 5, 15, 16 and 6 will rotate more slowly and will be accelerated in bringing about engagement with clutch half 11 which is rotated by the driven shaft 3. In the case of clutch 20, 22 in the counter train, the right clutch half 20 rotated by the driving shaft will be the slower moving and is to be accelerated in order to effect engagement with the faster moving left clutch half 22 rotated through the driven shaft. In the case of clutch 23, 21, the right hand clutch half 23 rotated through the driving shaft will be the faster moving part and is to be decelerated in effecting engagement with the slower moving clutch half 21 rotated through the driven shaft.

The accelerating mechanism of the invention includes an auxiliary transmission providing a drive back from the driven shaft 3 for speeding up the right hand clutch halves which are slower moving. In the present embodiment the auxiliary transmission includes a shaft 27 having its left end 14 splined to driven shaft 3 and extending through the hollow shafts 16' and 15'. Fixed to the right end of shaft 27 is a clutch disc 28. A special gear 35 is freely supported on shaft 27 meshing with a special gear 25 on shaft 5'. Gear 35 is axially movable through an operating lever 36 and is formed with a friction surface 29 which, when the gear is moved to the right engages friction surface 30 on disc 28 and thereby connects gear 35 with shaft 27 for rotation by driven shaft 3.

It will be observed that gear 35 is relatively large and its coacting gear 25 relatively small. The ratio therebetween is greater than the gear ratio between gears 17 and 7. Thus shaft 5' of the transmission can be driven at a higher speed by driven shaft 3 during the course of shifting than could be produced by a drive back from driven shaft 3 through gears 17 and 7 which operate in first speed. The ratio of gears 35 and 25 being greater than 1:1, shaft 5' will be caused to rotate at a higher speed than driven shaft 3. Through this arrangement as will be more fully hereafter explained the slower moving right hand clutch halves can be speeded up to a point exceeding the speed of their coacting faster moving left hand clutch halves and engagement rapidly brought about.

The deceleration of faster moving right hand clutch halves may be effected through a common braking mechanism which may be operated interchangeably and selectively in lieu of or in addition to the accelerating mechanism driven from the driven shaft. The braking mechanism comprises a friction surface 31 on the above referred to gear 35, and a coacting friction surface 32 on a stationary ring 33 mounted in the transmission housing. Hence while gear 35 can be moved to the right so as to engage disc 28 and be speeded up through the driven shaft 3 and auxiliary shaft 27, movement of gear 35 to the left by lever 36 will produce braking engagement with ring 33 and cause the same to slow down. Gear 25 and shaft 5' will be similarly braked, and through the intervening parts of the transmission rotated by shaft 5' the faster moving right hand clutch parts can be slowed down to hasten engagement.

In shifting from first gear to second gear, or from third gear to fourth gear the main clutch 2 will first be disengaged as usual. While in first or third gear, clutch 20, 22 is connected, and clutch parts 10 and 12 are free. Since clutch half 10 is rotating faster than the left half clutch 12 its speed is decreased by moving gear 35 to the left into braking engagement with ring 33 through coacting surfaces 31 and 32. The slowing down of gear 35 acts through gear 25 to rapidly slow down shaft 5' which carries clutch half 10. As soon as the R. P. M. of clutch half 10 begins to drop below that of the opposing clutch half 12, overtaking synchronization occurs and the clutch parts can be engaged.

In shifting from second to first gear, or from fourth to third gear, clutch 10, 12 must be disengaged, and clutch 20, 22 engaged. After the main clutch 2, and clutch 10, 12 have been disengaged clutch half 20 is accelerated to overtaking synchronization with respect to clutch half 22. This is accomplished by moving gear 35 to the right by lever 36 so that through friction surfaces 29 and 30 gear 35 is clutched to shaft 27. By reason of the gear ratio between gears 35 and 25, the driven shaft 3 of the transmission acting through shaft 27, gears 35 and 25 will speed up shaft 5', which in turn through gears 5 and 15 will accelerate clutch half 20. The R. P. M. of clutch half 20 will tend to increase to a point beyond that of the left clutch half 22, and as soon as this occurs the two clutch parts can be engaged to produce a driving connection between shafts 15' and 16'.

In shifting from second gear to third gear two synchronizing actions may be employed since clutches 10, 12 and 13, 11 which are engaged in second gear are disengaged, slower moving clutch half 20 engaged with clutch half 22, and faster moving clutch half 23 engaged with clutch half 21. If it is assumed that clutch 10, 12 is first disengaged, the first synchronizing action will consist in moving gear 35 to the right so as to connect the same with driven shaft 3 through shaft 27. Through gears 35 and 25, shaft 5', and gears 5 and 15, clutch part 20 will be accelerated so as to overtake clutch part 22 and thereupon clutching engagement can be completed. Gear 35 will thereupon be moved to the left so as to be disengaged from shaft 27 and freed of driving connection with driven shaft 3. Thereafter clutch 13, 11 is disengaged, gear 35 moved to the left into braking engagement with ring 33. Shaft 5' will be accordingly slowed down, and will act through gears 5, 15, and the driving connection between shafts 15', 16', now existing through engagement of clutch 20, 22, to decelerate clutch half 23 and enable the same to be engaged with clutch half 21. Thereafter gear 35 will be moved to the right to its intermediate position.

If in shifting from second to third gear clutch 13, 11 is disengaged before clutch 10, 12, the two synchronizing actions will be reversed. In such case upon the disengagement of clutch 13, 11, gear 35 will be moved to the left into braking engagement with ring 33, and clutch half 23 will be decelerated through shaft 5', the still existing connection of clutch 10, 12, and gears 6, 16. After engagement of clutch 23, 21, clutch 10, 12, is disengaged and acceleration of clutch half 20 effected by moving gear 35 to the right to produce the driving connection with driven shaft 3 through gears 5, 15.

In going from second to third gear clutches 10, 12 and 13, 11 may be disengaged simultaneously, and in such case only the decelerating mechanism will be employed. Under such circumstances the speed of the free running gear 6, 16 will rapidly decrease by reason of oil friction in the transmission casing, and this will result in a slowing down of the left clutch half 22 so that it can be brought into engagement with the originally slower moving right hand clutch half 20 without the need of accelerating clutch half 20. When clutch half 20, 22 has been engaged, gear 25 can be moved to the left for braking action with ring 33. Through the connections previously described clutch half 23 will be decelerated and can then be engaged with clutch half 21.

In going from third gear to second gear clutch 20, 22 may be first disengaged and clutch half 10 may be slowed down preparatory to engagement with clutch half 12 by moving gear 35 to the left. Thereafter clutch 23, 21 may be disengaged and synchronization of clutch 13, 11 effected by moving gear 35 to the right and accelerating clutch half 13.

Through the example given it will be seen that by effecting a driving connection back from the driven shaft to the driving shaft side of the transmission, and the employment of a suitable gear ratio in the auxiliary transmission, the slower moving right hand clutch halves rotated through the driving shaft may be quickly accelerated independently of the speed of their coacting left hand parts which are rotated through the transmission proper by the driven shaft. Those of the right hand clutch halves rotated through the driving shaft at a faster speed than their coacting left hand parts are rotated through the driven shaft can be rapidly decelerated through the brake mechanism connecting with the auxiliary transmission.

In the second illustrative transmission shown in Fig. 2 the driving shaft is designated 1 and the main clutch 2, 26. Shafts 45′, 46′ and driven shaft 40 constitute the main shaft train, and fixed to such respective shafts are gears 45, 46 and 47. The counter shaft train comprises shafts 55′, 56′ and 57′ to which are fixed gears 55, 56 and 57 which respectively mesh with gears 45, 46 and 47. The clutches for selectively interconnecting the different shaft sections are similar to those in Fig. 1 and comprise coacting clutch halves 50 and 52, 53 and 51, 60 and 62, 63 and 61. Clutch sleeves 50 and 60 are connected so as to be reversely operative, and the same is true of clutch sleeves 51 and 61. The four forward speeds of the transmission are obtained as follows:

*1st gear:* Shaft 45′, gears 45, 55, clutch 60, 62, shaft 56′, clutch 63, 61, gears 57, 47, driven shaft 40;

*2nd gear:* Shaft 45′, gears 45, 55, clutch 60, 62, gears 56, 46, clutch 53, 51, driven shaft 40;

*3rd gear:* Shaft 45′ clutch 50, 52, gears 46, 56, clutch 63, 61, gears 57, 47, driven shaft 40; and,

*4th gear:* (direct) Shaft 45′, clutch 50, 52, shaft 46′, clutch 53, 51, driven shaft 40.

In the present embodiment right hand clutch halves 50 and 53 will rotate faster than their coacting left clutch halves 52 and 51, and are to be decelerated. Clutch halves 60 and 63 will rotate at a higher R. P. M. than their coacting left hand clutch halves 62 and 61, and will be accelerated according to the invention.

The accelerating mechanism for speeding up the slower moving clutch parts again comprises an auxiliary transmission connecting a part driven by the driven shaft with a part on the driving shaft side of the transmission, whereby the right hand clutch halves may be connected with and driven by the driven shaft 40 at a higher speed than would otherwise prevail in the transmission. The auxiliary transmission comprises a special shaft 80 driven through suitable gearing from the driven shaft 40 and operating to speed up gear 55 which is normally driven from shaft 45′ by gear 45. The driving connection between driven shaft 40 and shaft 80 comprises the main transmission gears 47, 57, special gear 48 which is fixed to shaft 57′ with gear 57, and special gear 49 on the left end of shaft 80 which meshes with gear 48. At the right end of shaft 80 is a gear 59 which meshes with a gear 58 journaled for free rotation on shaft 55′ adjacent gear 55. Gear 55, which is one of the main gears of the transmission, is specially constructed and provided with means for clutching the same to gear 58. Slidably supported in bores 70 on the left of gear 55 are a series of pistons 72 which are movable to the left to shift clutch disc 74 splined to the hub of gear 58 into engagement with a clutch flange 76 at the left end of gear 55. Pistons 72 are actuatable by oil or other fluid pressure introduced through passage 67 in stub shaft 65 into passage 68 and thence into bores 70. Through the auxiliary transmission, gears 55 and 45, and their shafts 55′ and 45′ may be accelerated by a driving connection back from the driven shaft 40.

Provision is also made so that the parts last referred to can be slowed down. To this end a stationary ring 78 is mounted in the transmission housing at the right end of shaft 55′. In the right hand side of gear 55 are a series of bores 71 in which are slidable pistons 73 under fluid pressure supplied through lines 66 and 69 to cause clutch disc 77, splined for axial movement on the stationary ring 78 to engage clutch flange 75 on gear 55. Thus through the control of fluid pressure clutch parts 75 and 77 may be caused to engage and decelerate gear 55 and the parts in driving connection therewith. Through the combined arrangement described including the separate fluid pressure passages 67 and 66, and the respective sets of pistons 72 and 73 gear 55 may on the one hand be clutched to gear 58 and accelerated by the driven shaft 40 through the auxiliary transmission shaft 80, and on the other hand may be braked and slowed down through frictional engagement with the stationary ring 78.

To enable the slower moving right hand clutch halves 60 and 63 to be speeded up sufficiently to overtake their respective coacting left hand clutch halves 62 and 61, gears 48 and 49 of the auxiliary transmission will have a ratio greater than 1:1, and it will be noted that gear 48 is substantially larger than gear 49. Thus while gear 48 and left hand clutch sleeve 61 are rotated at the same speed through gears 47, 57 by the driven shaft 40, the right hand clutch sleeve 63 will through gear 48 and the other parts of the auxiliary transmission be accelerated to overtake clutch sleeve 61, as in going from second to first speed. It will be evident in this connection that the R. P. M. of both clutch halves 60 and 63 when driven through the auxiliary transmission will be greater than their speed during normal driving operation in first gear during which the sets of main transmission gears 47, 57, and 45, 55 are active.

To explain the operation of the synchronizing mechanism a shift from second to third gear will be taken as an example. During operation of the transmission in second gear clutches 53, 51 and 60, 62 are engaged. These must be disengaged and the oppositely acting clutches engaged. Clutch half 51 may first be disengaged from clutch half 53. Preparatory to engagement of the slower moving clutch half 63 with faster moving clutch half 61 fluid pressure is supplied through passage 67, and acting on pistons 72 causes gear 55 to be engaged with auxiliary gear 58. Through gears 47, 57, and the various parts of the auxiliary transmission, gear 55 is connected with the driven shaft 40 and accelerated thereby. It being assumed that clutch 60, 62 is still engaged, the acceleration of gear 55 will be effective through shafts 55' and 56' to speed up clutch half 63 so that it will overtake clutch half 61 and can be engaged therewith. When this occurs pressure in line 67 will be released and clutching engagement between gears 55 and 58 broken. If now clutch 60, 62 is disengaged and the oppositely acting clutch 50, 52 prepared for engagement, the faster clutch half 50 is decelerated. This is done by supplying pressure through line 66 to act on pistons 73 and produce frictional braking engagement of gear 55 with the stationary ring 78. The slowing down of gear 55 results in deceleration of gear 45 and shaft 45', and therethrough clutch half 50 is slowed down to a speed at which it can be engaged with the originally slower moving clutch half 52. Thereupon the pressure in line 66 is released as the shift to third gear is now completed.

If in going from second to third gear clutch 60, 62 is disengaged before clutch 53, 51, the synchronizing actions will be reversed. That is to say, gear 55 will first be braked by clutching engagement with disc 77 of ring 78 to decelerate the faster moving clutch half 50. When synchronization has occurred and clutch 50, 52 has been engaged, gear 55 will then be accelerated through the auxiliary transmission from the driven shaft to speed up the slower moving clutch half 63 and enable the same to be engaged with the originally faster moving clutch half 61.

The operation of the synchronizing mechanism for other gear shifts will be generally understood from the examples already given. In going from first to second gear, clutch 60, 62, being used in both remains connected, and following disengagement of clutch 63, 61, the faster moving clutch half 53 will be decelerated preparatory to engagement with clutch half 51. The accelerating mechanism is not employed in the shift. Conversely, when shifting from second to first, clutch 53, 51 is disengaged, clutch half 63 accelerated and then engaged with clutch half 61. The braking mechanism is not employed in such shift. In shifting from third to fourth, clutch 50, 52 which is employed in both speeds remains connected. Clutch 63, 61 is disengaged, clutch half 53 is decelerated and then engaged with clutch half 51. In shifting from fourth to third gear clutch half 53 is accelerated after clutch 53, 51 is released, and then engaged with clutch half 61.

In the arrangement shown in Fig. 2 the control of the actuating pressure for selectively bringing into action the accelerating mechanism and the decelerating mechanism may be effected in any desired way obvious to those skilled in the art, and it has not been deemed necessary to illustrate any mechanism for such purpose. The actual shifting mechanism for selectively moving the various claw clutches in both the embodiments of Figs. 1 and 2 does not form a part of the present mechanism and shifting may be effected in any suitable manner known to the art either mechanically or through a pressure operated device. As already explained, the operation of the synchronizing mechanism will be momentary only and will take place at an intermediate stage in the shift from one gear selection to another.

The several forms of synchronizing mechanism while differing from each other in detail embody the same operating principles. They are illustrative only and the scope of the invention is to be determined according to the appended claims.

I claim:

1. In a variable speed gear transmission, a main shaft train comprising a plurality of independently rotatable, alined, gear-carrying shaft sections, a countershaft train comprising a plurality of independently rotatable, alined, shaft sections, each carrying a gear in constant mesh with a gear of the main shaft train, a driving input shaft section constituting the first shaft section of the main shaft train, a driven output shaft section constituting the last shaft section of one of said shaft trains, coacting clutch halves in each shaft train for selectively connecting together adjacent shaft sections to provide different drives between the input and output shaft sections, and accelerating means for speeding up a slower rotating clutch half in driving connection with the input shaft preparatory to engagement with its coacting faster rotating clutch half comprising auxiliary driving means driven by the output shaft and operating, independently of any driving connection between the output shaft and the faster rotating clutch half, to speed up shaft sections of the transmission on the input shaft side of the slower rotating clutch half.

2. In a variable speed gear transmission, a main shaft train comprising a plurality of independently rotatable, alined, gear carrying shaft sections, a countershaft train comprising a plurality of independently rotatable, alined, shaft sections, each carrying a gear in constant mesh with a gear of the main shaft train, a driving input shaft section constituting the first shaft section of the main shaft train, a driven output shaft section constituting the last shaft section of one of said shaft trains, coacting clutch halves in each shaft train for selectively connecting together adjacent shaft sections to provide different drives between the input and output shaft sections, and accelerating means driven by the output shaft for speeding up a slower rotating clutch half in driving connection with the input shaft preparatory to engagement with its coacting faster rotating clutch half, said accelerating means operating through one shaft section of the countershaft train located between the clutch half to be speeded up and the driving input shaft section and being operative independently of another shaft section of the countershaft train located between the output shaft section and the coacting faster rotating clutch half.

3. In a variable speed gear transmission, a main shaft train comprising a plurality of independently rotatable, alined, gear-carrying shaft sections, a countershaft train comprising a plurality of independently rotatable, alined, shaft sections, each carrying a gear in constant mesh with a gear of the main shaft train, a driving input shaft section constituting the first shaft section of the main shaft train, a driven output shaft section constituting the last shaft section of one of said shaft trains, coacting clutch halves in each shaft train for selectively connecting together adjacent shaft sections to provide different drives between the input and output shaft sections, and a common accelerating synchronizer for the coacting clutch halves of a plurality of the clutches comprising auxiliary driving means driven independently of one or more shaft sections of the transmission by the output shaft and operating through one or more parts in driving connection with the input shaft to selectively speed up each of a plurality of clutch halves preparatory to its engagement with its coacting clutch half.

4. A variable speed gear transmission according to claim 3, wherein the accelerating synchronizer includes an auxiliary shaft driven from the output shaft of the transmission rotatable independently of one or more shaft sections of the transmission, and means providing a driving connection between said auxiliary shaft and the first shaft section of one of the shaft trains.

5. A variable speed gear transmission according to claim 3, wherein the accelerating synchronizer includes auxiliary gearing providing a higher gear ratio between the output shaft and the input shaft than provided when said output and input shafts are interconnected in normal operation through any sets of gears of the transmission.

6. A variable speed gear transmission according to claim 3, wherein the accelerating synchronizer includes an auxiliary shaft rotatable independently of one or more shaft sections of the transmission and a pair of constantly meshing auxiliary gears providing a higher gear ratio between the output and the input shafts than provided when the output and input shafts are interconnected solely through any of the regular gears of the transmission.

7. A variable speed gear transmission according to claim 3, wherein the accelerating synchronizer includes an auxiliary shaft driven from the last shaft section of the countershaft train, and means providing a driving connection between said auxiliary shaft and the first shaft section of one of the trains.

8. A variable speed gear transmission according to claim 3, wherein the accelerating syncronizer includes an auxiliary shaft driven through the output shaft, and auxiliary gearing providing a driving connection between the auxiliary shaft and the input shaft of the transmission.

9. A variable speed gear transmission according to claim 3, wherein the accelerating synchronizer includes an auxiliary shaft driven through the output shaft, and auxiliary gearing interconnecting the auxiliary shaft to the first shaft section of the countershaft train.

10. In a variable speed gear transmission, a main shaft train comprising a plurality of independently rotatable, alined, gear-carrying shaft sections, a countershaft train comprising a plurality of independently rotatable, alined, shaft sections, each carrying a gear in constant mesh with a gear of the main shaft train, a driving input shaft section constituting the first shaft section of the main shaft train, a driven output shaft section constituting the last shaft section of one of said shaft trains, coacting clutch halves in each shaft train for selectively connecting together adjacent shaft sections to provide different drives between the input and output shaft sections, accelerating auxiliary driving means driven from the output shaft and operative independently of one or more shaft sections of the transmission located between the output shaft section and the first shaft sections of the main and countershaft trains to speed up the first shaft sections of the main and countershaft trains, and alternately operative means for decelerating the first shaft sections of the main and countershaft trains and being operative independently of other shaft sections of said trains.

11. In a variable speed gear transmission, a main shaft train comprising a plurality of independently rotatable, alined, gear-carrying shaft sections, a countershaft train comprising a plurality of independently rotatable, alined, shaft sections, each carrying a gear in constant mesh with a gear of the main shaft train, a driving input shaft section constituting the first shaft section of the main shaft train, a driven output shaft section constituting the last shaft section of one of said shaft trains, coacting clutch halves in each shaft train for selectively connecting together adjacent shaft sections to provide different drives between the input and output shaft sections, and selectively operative accelerating means and decelerating means including a gear at the input end of the transmission in driving connection with the input shaft section, an auxiliary accelerating shaft driven from the output shaft section together with auxiliary means for connecting the auxiliary shaft to said gear at the input end, brake means at the input end for decelerating said same gear and control means selectively operative to connect said gear to said braking means and to the auxiliary accelerating shaft.

RICHARD LANG.